US011423705B2

(12) United States Patent
Murray et al.

(10) Patent No.: US 11,423,705 B2
(45) Date of Patent: Aug. 23, 2022

(54) SECURE C-V2X SMART TOLLING

(71) Applicant: FORD GLOBAL TECHNOLOGIES, LLC, Dearborn, MI (US)

(72) Inventors: Allen R. Murray, Lake Orion, MI (US); Syed Amaar Ahmad, Canton, MI (US); Ivan Vukovic, Birmingham, MI (US); Sathyanarayana Palakonda, Novi, MI (US); Erik Kiledal, Hillsdale, MI (US); Joseph F. Stanek, Northville, MI (US); Thomas Varghese, Farmington Hills, MI (US); Brennan Hamilton, Birmingham, MI (US); Krishna Bandi, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 468 days.

(21) Appl. No.: 16/682,735

(22) Filed: Nov. 13, 2019

(65) Prior Publication Data

US 2021/0142585 A1 May 13, 2021

(51) Int. Cl.
*G07B 15/06* (2011.01)
*G08G 1/0967* (2006.01)
*H04W 4/06* (2009.01)
*H04W 4/40* (2018.01)

(52) U.S. Cl.
CPC ..... *G07B 15/063* (2013.01); *G08G 1/096783* (2013.01); *H04W 4/06* (2013.01); *H04W 4/40* (2018.02)

(58) Field of Classification Search
None
See application file for complete search history.

(56) References Cited

U.S. PATENT DOCUMENTS

2018/0158254 A1* 6/2018 Fustes .................. H04W 4/02
2018/0357837 A1* 12/2018 Ieuji ................... G01S 5/0036
2019/0164357 A1* 5/2019 John .................. G01C 21/3658

\* cited by examiner

*Primary Examiner* — Thomas S McCormack
(74) *Attorney, Agent, or Firm* — Michael J. Spenner; Brooks Kushman P.C.

(57) ABSTRACT

Toll advertisement messages (TAMs) are broadcast via V2X communication, each of the TAMs indicating geographic locations of lanes of a roadway for which tolls are due and cost information for traversing the lanes of the roadway. A tolling usage message (TUM) is received via the V2X communication, the TUM indicating, to a roadside unit (RSU), information regarding a vehicle entering one of the lanes of the roadway and a unique random account identifier to be used by the RSU to identify the vehicle. A toll receipt message (TRM) is broadcast via the V2X communication, the TRM including the unique random account identifier and indicating, to the vehicle, a final cost charged to the vehicle for access to the one of the lanes of the roadway.

20 Claims, 9 Drawing Sheets

SECURE C-V2X SMART TOLLING

TECHNICAL FIELD

Aspects of the present disclosure generally relate to smart tolling systems for use with cellular-vehicle-to-everything (C-V2X) communication.

BACKGROUND

Toll roads are roadways that assess a charge to the vehicle for their use. The fees charged for use of the toll road are typically used to cover the costs of building and maintaining the road. Some toll roads have toll stations such as toll booths where users stop to pay the toll. Other toll roads have electronic systems where a vehicle has a transponder that provides information to the toll stations to allow a payment to be made. The transponders in many cases are radio-frequency identification devices (RFIDs). In some installations, a toll gantry is installed across the roadway, to which wireless antennas are attached that communicate with the vehicle transponders. Cameras may additionally be attached to the gantry and aimed at the roadway, to take pictures of the vehicle license plates for verification purposes.

SUMMARY

In one or more illustrative examples, a vehicle for smart tolling includes a telematics control unit configured to provide vehicle-to-everything (V2X) communication and a processor. The processor is programmed to receive a toll advertisement message (TAM) from a roadside unit via the V2X communication, the TAM indicating geographic locations of lanes of a roadway controlled by a tolling site and cost information for traversing the lanes of the roadway, identify entrance of the vehicle into a start zone for the tolling site, the start zone indicated by the geographic locations, indicate, to a user interface of the vehicle, that the vehicle has entered the start zone for the tolling site, identify one of the lanes of the roadway into which the vehicle is entering according to the geographic locations, and indicate, to the user interface of the vehicle, that the vehicle has entered the one of the lanes.

In one or more illustrative examples, a system for smart tolling includes a toll charger server and a roadside unit (RSU). The RSU is configured to broadcast to vehicles via V2X communication and to communicate with the toll charger server over a secure channel, wherein the RSU is programmed to broadcast toll advertisement messages (TAMs) via the V2X communication, each of the TAMs indicating geographic locations of lanes of a roadway for which tolls are due and cost information for traversing the lanes of the roadway, receive a tolling usage message (TUM) via the V2X communication, the TUM indicating, to the RSU, information regarding a vehicle entering one of the lanes of the roadway and a unique random account identifier to be used by the RSU to identify the vehicle, and broadcast a toll receipt message (TRM) via the V2X communication, the TRM including the unique random account identifier and indicating, to the vehicle, a final cost charged to the vehicle for access to the one of the lanes of the roadway.

In one or more illustrative examples, a method for smart tolling includes broadcasting toll advertisement messages (TAMs) via the V2X communication, each of the TAMs indicating geographic locations of lanes of a roadway for which tolls are due and cost information for traversing the lanes of the roadway; receiving a tolling usage message (TUM) via the V2X communication, the TUM indicating, to a roadside unit (RSU), information regarding a vehicle entering one of the lanes of the roadway and a unique random account identifier to be used by the RSU to identify the vehicle; and broadcasting a toll receipt message (TRM) via the V2X communication, the TRM including the unique random account identifier and indicating, to the vehicle, a final cost charged to the vehicle for access to the one of the lanes of the roadway.

In one or more illustrative examples, a method for smart tolling includes receiving, by a telematics control unit of a vehicle, a toll advertisement message (TAM) broadcast from a roadside unit via V2X communication, the TAM indicating geographic locations of lanes of a roadway for which tolls are due and cost information for traversing the lanes of the roadway, identifying entrance of the vehicle into a start zone for the roadway, the start zone indicated by the geographic locations, indicating, to a user interface of the vehicle, that the vehicle has entered the start zone for the roadway, identifying one of the lanes of the roadway into which the vehicle is entering according to the geographic locations, and indicating, to the user interface of the vehicle, that the vehicle has entered the one of the lanes.

BRIEF DESCRIPTION OF THE DRAWINGS

FIG. 8 illustrates an example of a toll usage message;

FIG. 9 illustrates an example of a toll receipt message;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Current electronic tolling systems may use RFID-based and gantry-based technology platforms. However, such platforms may not provide for real-time notifications of toll usage rates in advance of the customer entering the toll zone. Moreover, such systems typically lack in-vehicle human-machine interface (HMI) of dynamic toll rates based on congestion. Additionally, such systems do not use the in-vehicle HMI to aid in lane selection nor do they provide in-vehicle real-time traffic alerts. Nor do they send real time receipts of the toll payment transaction to the customer upon exiting the toll road, which may also be accessed via the in-vehicle HMI. Yet further, such systems require the driver to reduce vehicle speed near toll lanes, which reduces the efficiency of the vehicle and increases drive time.

As explained in detail herein, the disclosed approaches utilize C-V2X technology to provide for real time-notifications of toll usage rates in advance of a customer entering a toll zone (e.g., ahead of 1000 meters based on roadside unit (RSU) transmission line-of-sight). The disclosed approach also aids in payment of the toll, avoiding waiting in a line or reducing the vehicle speed. Moreover, the disclosed approach aids in with lane selection and the display of toll charges on in-vehicle HMI. Using the approach, toll agencies may be able to autonomously control toll gates, with functionality such as dynamic toll lane rates based on congestion, real-time traffic alerts, and the providing of real-time receipts of the toll transaction to the customer upon exiting the toll road.

Figure 1:
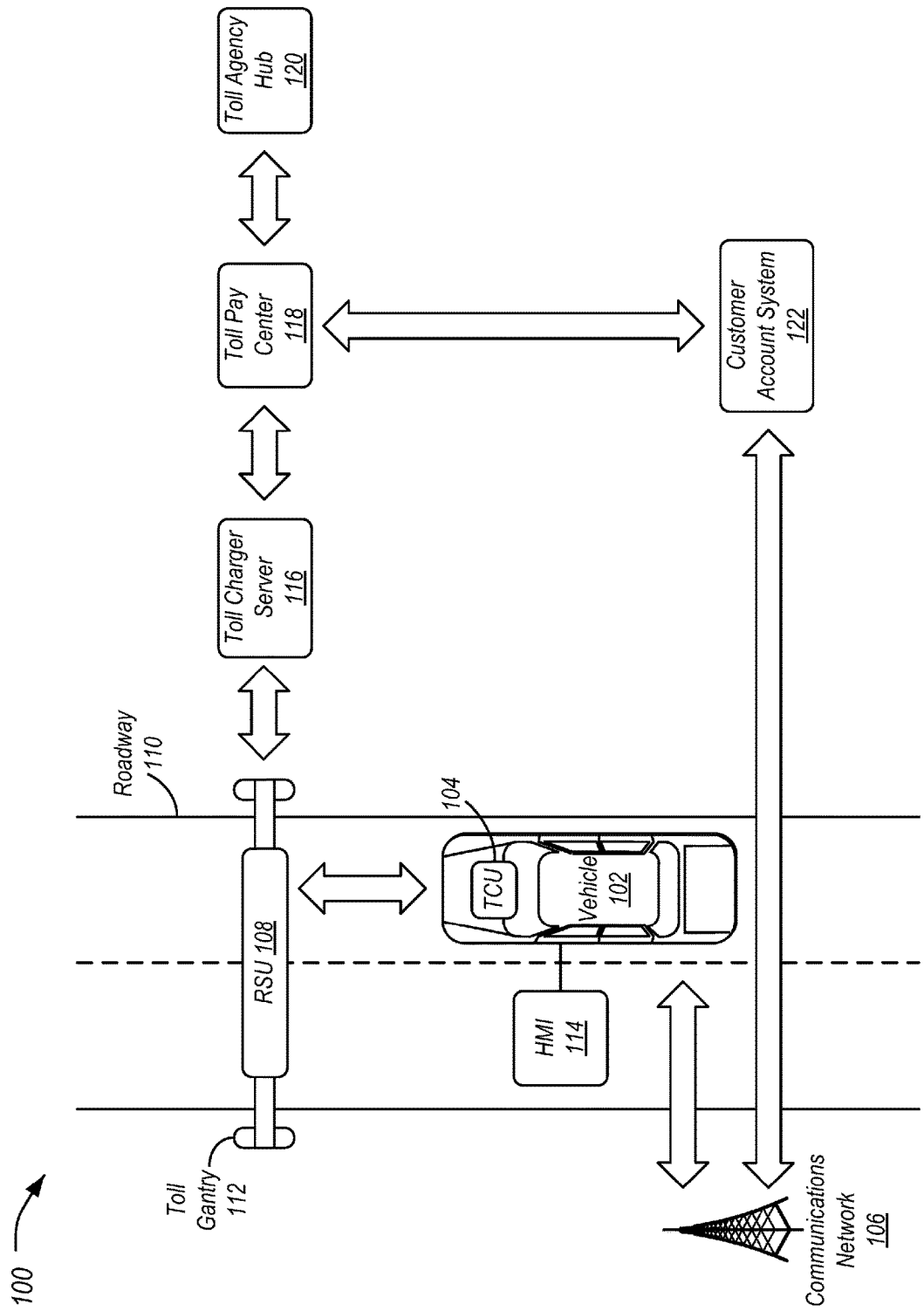
FIG. 1 illustrates an example smart tolling system for use with C-V2X communication.

FIG. 1 illustrates an example smart tolling system 100 for use with C-V2X communication. As shown, the system 100 includes a wireless-enabled vehicle 102 configured to travel along a roadway 110. The vehicle 102 includes a telematics control unit (TCU) 104 and an HMI 114. The system 100 also includes a toll gantry 112 or other toll installation that includes a roadside unit (RSU) 108. The RSU 108 communicates with a toll charger server 116 over a secure channel (such as a wired connection), which in turn communicates with a toll pay center 118. The toll pay center 118 also communicates with a toll agency hub 120 and a customer account system 122. Using the TCU 104, the vehicle 102 communicates with the RSU 108 over a broadcast peer-to-peer protocol (such as PC5), and with a communications network 106 over a network protocol, which allows the vehicle 102 to communicate with the customer account system 122, for example. It should be noted that the system 100 shown in FIG. 1 is merely an example, and systems having more, fewer, and different arrangements of elements may be used. For instance, one or more of the RSU 108, toll charger server 116, toll pay center 118, and toll agency hub 120 may be combined into a single device. Moreover, while only one vehicle 102 along one roadway 110 is shown, it is contemplated that systems 100 would include many vehicles 102 and roadways 110 to traverse.

The vehicles 102 may include various other types of passenger vehicles, such as sedans, crossover utility vehicles (CUVs), vans, sport utility vehicles (SUVs), trucks, recreational vehicles (RVs), scooters, drones, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The TCU 104 may be configured to provide telematics services to the vehicle 102. These services may include, as some non-limiting possibilities, navigation, turn-by-turn directions, vehicle health reports, local business search, accident reporting, and hands-free calling. The TCU 104 may accordingly be configured to communicate over various protocols, such as with a communication network 106 over a network protocol (such as Uu). The TCU 104 may, additionally, be configured to communicate over a broadcast peer-to-peer protocol (such as PC5), to facilitate C-V2X communications with devices such as the RSU 108. It should be noted that these protocols are merely examples, and different peer-to-peer and/or cellular technologies may be used.

The communications network 106 may provide communications services, such as packet-switched network services (e.g., Internet access, voice over Internet Protocol (VoIP) communication services), to devices connected to the communications network 106. An example of a communications network 106 is a cellular telephone network. For instance, the TCU 104 may access the cellular network via connection to one or more cellular towers. To facilitate the communications over the communications network 106, the TCU 104 may be associated with unique device identifiers (e.g., mobile device numbers (MDNs), Internet protocol (IP) addresses, etc.) to identify the communications of the TCU 104 on the communications network 106 as being associated with the vehicle 102.

The RSU 108 may be a device with processing capabilities and networking capabilities, and may be designed to be placed in proximity of a roadway 110 for use in communicating with vehicles 102. In an example, the RSU 108 may include hardware configured to communicate over the broadcast peer-to-peer protocol (such as PC5), to facilitate C-V2X communications with the vehicles 102. The RSU 108 may also have wired or wireless backhaul capability to allow for communication with other elements of the communications network 106, such as the toll charger server 116.

The toll gantry 112 may be framework installed across the roadway 110. The toll gantry 112 may serve as a location to mount hardware to give the hardware a clear view of the roadway 110. In an example, the RSU 108 may be mounted to the toll gantry 112. It should be noted that, in other examples, the RSU 108 may be located along the ground adjacent to the roadway 110 and the toll gantry 112 may be omitted.

The HMI 114 may include various output devices configured to provide information to users, as well as input devices configured to receive information from users. Output devices may include, as some examples, display screens, touch screens, projectors, lights, speakers, buzzers, and haptic feedback sensors. Input devices may include, as some examples, touch screens, keyboards, buttons, knobs, and microphones, as some possibilities.

The toll charger server 116 is a networked computing device configured to perform operations in support of the functionality of the RSU 108. In an example, the toll charger server 116 may be in communication with the RSU 108 and may be programmed to operate as a gateway between the RSU 108 and the toll pay center 118. As explained in detail herein, the toll charger server 116 may be responsible for managing operations between the broadcast nature of the RSU 108 operations and the remainder of the system 100. These operations may include, for example, verification of messages received from vehicles 102 by the RSU 108, certificate verification and identification, and communication with the toll pay center 118 to perform further operations over a secure line. In many examples, each RSU 108 may be supported by its own corresponding toll charger server 116. However, in other examples, a single toll charger server 116 may be configured to handle multiple RSUs 108, such as a set of RSUs 108 covering operation of the roadway 110.

The toll pay center 118 is a networked computing device also configured to perform operations in support of the functionality of the system 100. In an example, the toll pay center 118 may be programmed to perform operations in support of the payment aspects for use of the roadway 110 by the vehicle 102. In some examples, the system 100 may include different toll pay centers 118, where each toll pay center 118 is configured to handle payments for those vehicles 102 having accounts with the toll pay center 118. As one possibility, different vehicle 102 manufacturers may each maintain their own toll pay center 118. As another possibility, vehicles 102 may subscribe to the use of various third-party toll pay centers 118.

The toll agency hub 120 is a networked computing device also configured to perform operations in support of the functionality of the system 100. The toll agency hub 120 may be configured to perform operations such as providing cost information to the various toll pay centers 118 with respect to the costs for usage of the roadway 110. For instance, the toll agency hub 120 may provide a toll schedule indicative of the costs of traversing the roadway 110, including costs for usage of different lanes (e.g., express, carpool, regular, etc.), usage for different classes of vehicles 102 (e.g., passenger cars, semi-trucks, etc.), usage for different times of day, and usage for high traffic vs low traffic situations. The toll agency hub 120 may also be configured to perform payment reconciliation operations, reporting functions, and may also provide information regarding vehicles 102 that are observed on the roadway 110 that may not have paid (e.g., as identified according to wireless transmissions of BSMs as defined in J2735, pictures from cameras, etc.).

The customer account system 122 is a networked computing device also configured to perform operations in support of the functionality of the system 100. Using the customer account system 122 a user may set up a payment account, be charged by the toll charger server 116 for use of the roadway 110, and request and receive toll receipts with respect to usage of the roadway 110.

Figure 2:
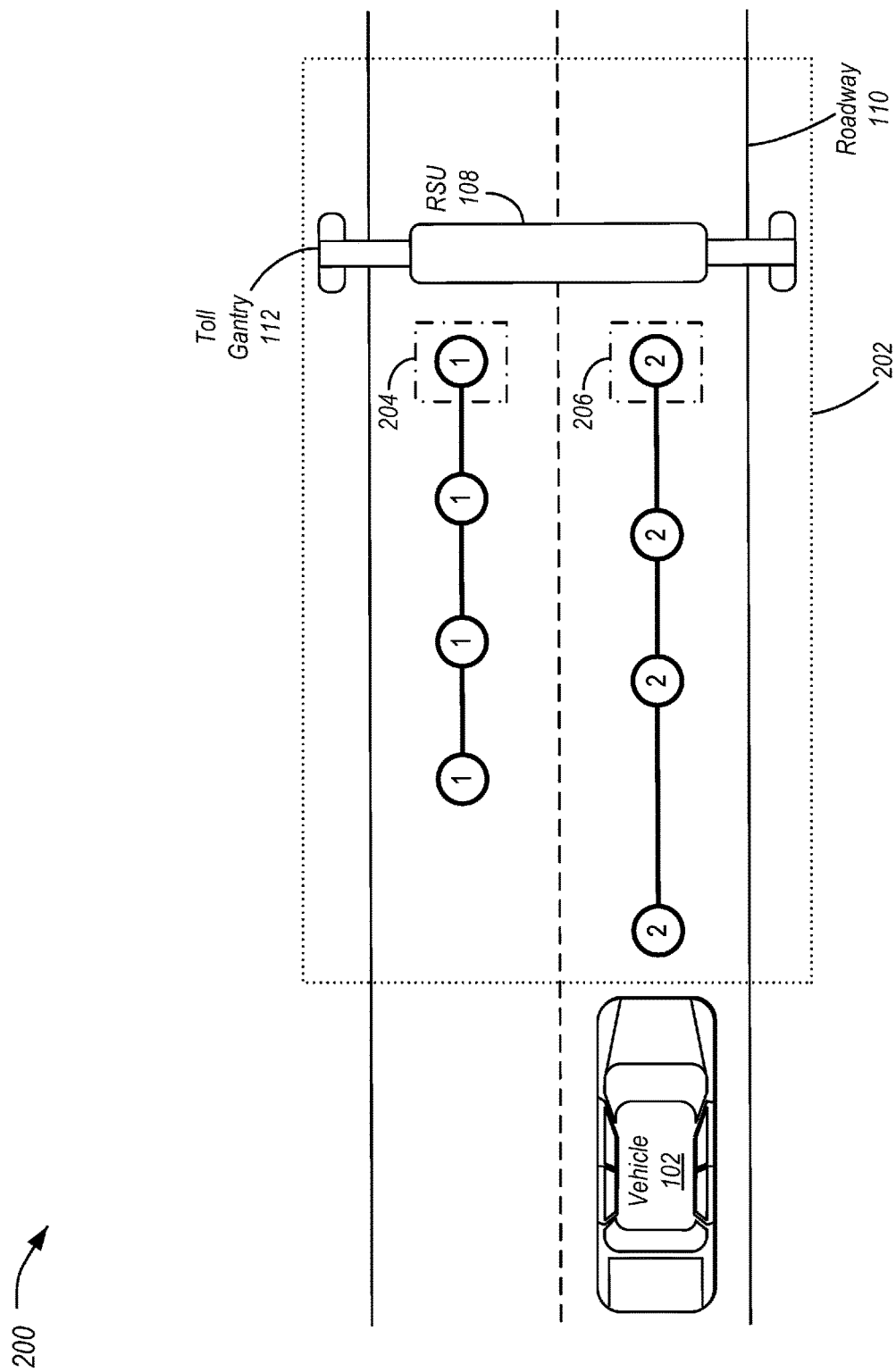
FIG. 2 illustrates an example detail of the roadway illustrating a definition of a lane of the roadway.

FIG. 2 illustrates an example 200 detail of the roadway 110 illustrating a definition of a lane of the roadway 110. A physical representation of the tolling site is represented by the V2X tolling gantry 112 installed along the roadway 110. It should be noted that in other examples, the tolling site may include the RSU 108 without the full tolling gantry 112. Regardless, a single RSU 108 may be used to control the tolling operation across multiple lanes as the RSU 108 may utilize a non-line of sight (NLOS) radio technology to communicate with the TCUs 104 of the vehicles 102. The toll station for each lane of the roadway 110 may be identified by a connection of points. For instance, a first lane of the roadway 110 is indicated by the first set of points denoted as (1), while a second lane of the roadway 110 is indicated by the second set of points denoted as (2).

The vehicle 102 may approach the general vicinity location 202 of the tolling site. This may be identified by the vehicle 102 according to geographic coordinates of the vehicle 102 as compared to coordinates of the tolling site. In one example, the vehicle 102 position may be determined using a global navigation satellite system (GNSS) receiver of the vehicle 102, while the general vicinity location 202 of the tolling site may be identified by transmission from the RSU 108 of information received by the vehicle 102. Responsive to the vehicle approaching the general vicinity 202, the vehicle 102 may display a message in the HMI 114 indicating that a charge may be applied for travel along the roadway 110. For instance, if the vehicle passes through each of the set of points denoted as (1), then at location 204 the vehicle 102 may indicate that the vehicle 102 is entering lane one. Or, if the vehicle passes through each of the set of points denoted as (2), then at location 206 the vehicle 102 may indicate that the vehicle 102 is entering lane two.

Figure 3:
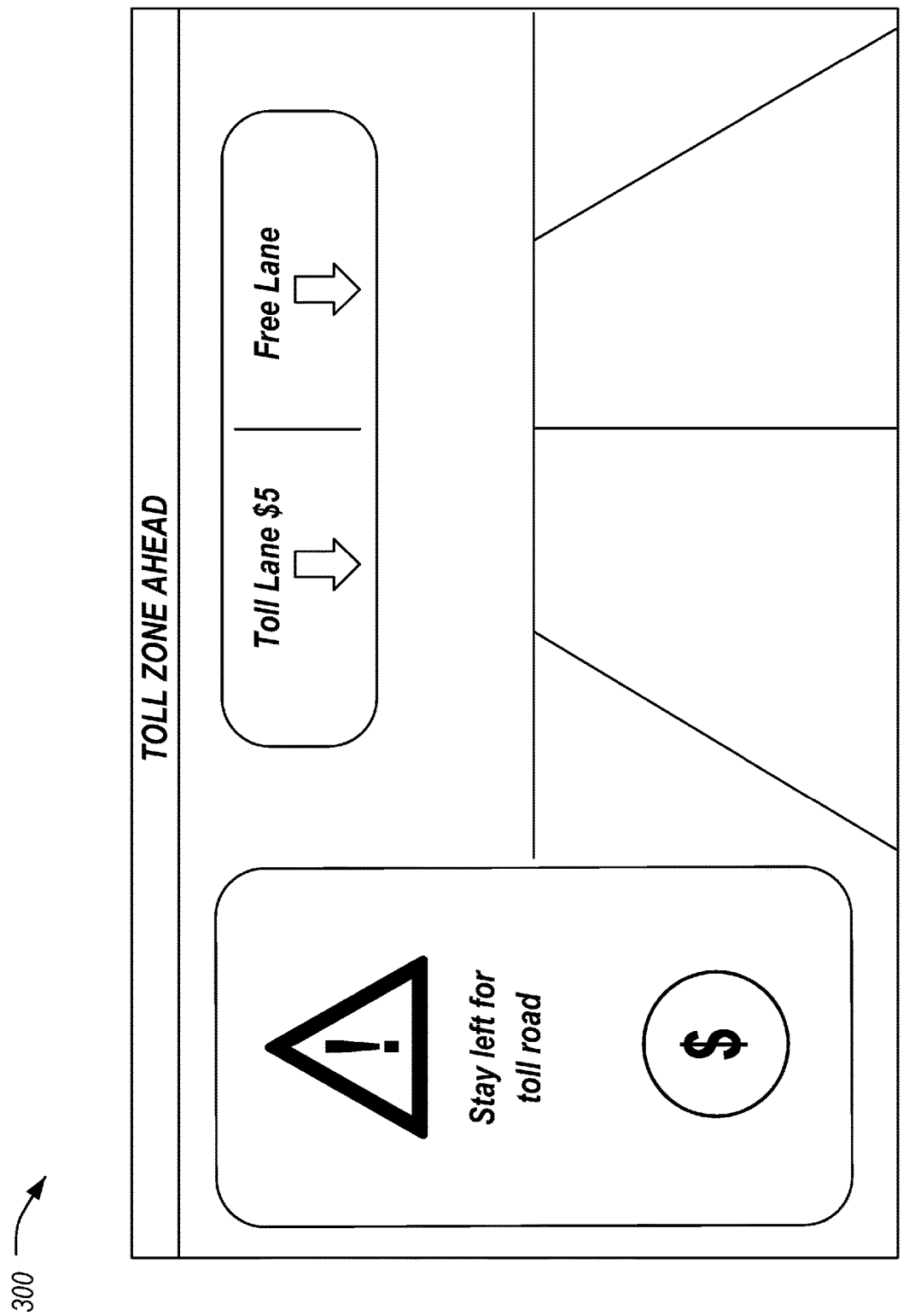
FIG. 3 illustrates an example of a message indicating that a vehicle is approaching the general vicinity of the tolling area.

FIG. 3 illustrates an example of a message 300 indicating that vehicle 102 is approaching the general vicinity location 202 of the tolling area. In an example, the message 300 may be displayed in the HMI 114 of the vehicle 102. The message 300 may indicate, for instance, the costs that may be incurred by the vehicle 102 for using the roadway 110.

The vehicle 102 may proceed along the roadway 110 to the tolling site. Responsive to the geographic coordinates of the vehicle 102 matching that of one of the lanes of the roadway 110, the vehicle 102 may display a message to the HMI 114 indicating that the vehicle 102 will be charged the amount indicated for the lane that the vehicle 102 is in. In one example, the vehicle 102 position may be determined using the GNSS receiver of the vehicle 102, while the points of the lanes of the roadway 110 may be identified by transmission from the RSU 108 of information received by the vehicle 102.

Figure 4:
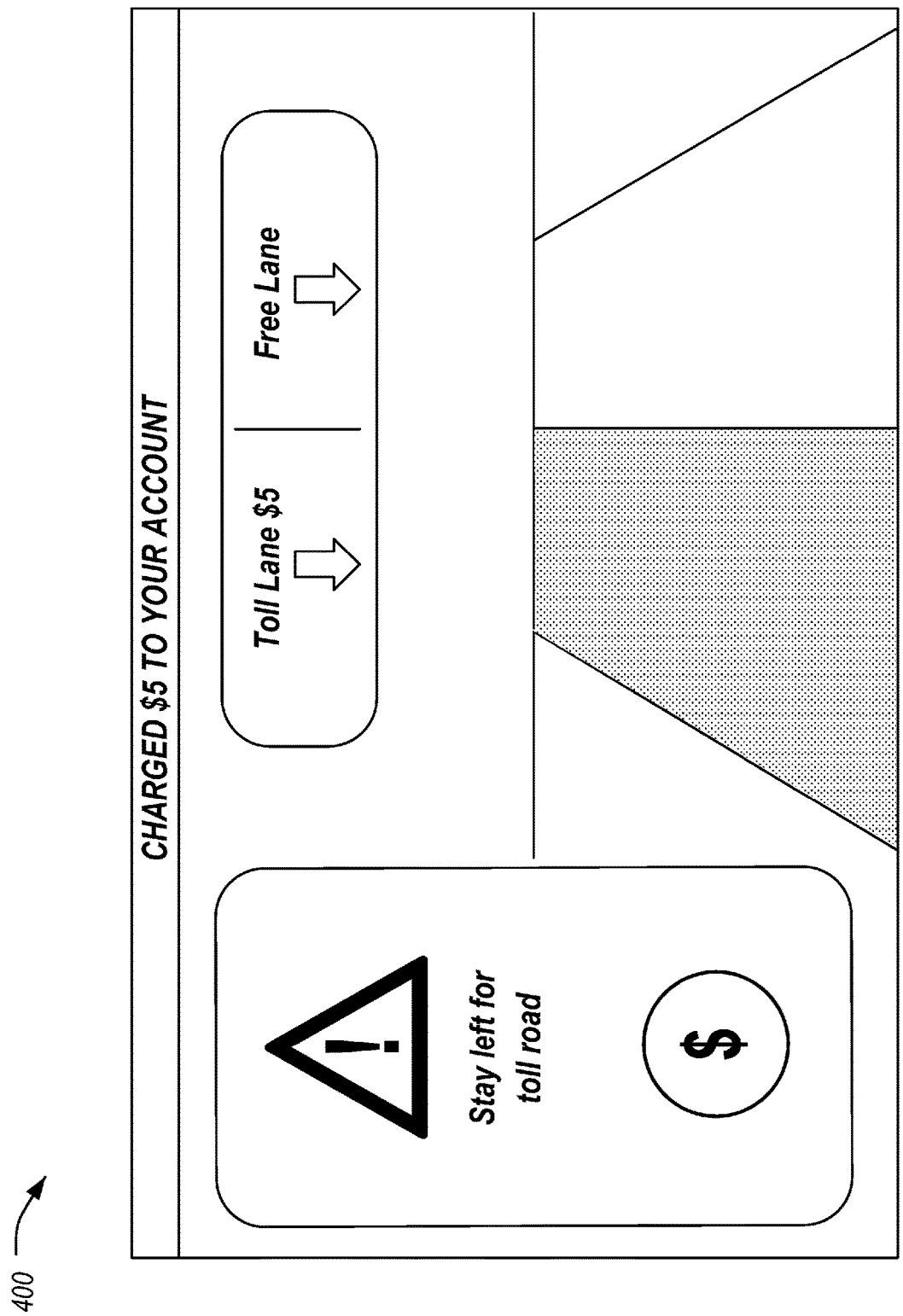
FIG. 4 illustrates an example of a message indicating that a vehicle is entering a specific lane of the roadway of the tolling area.

FIG. 4 illustrates an example of a message 400 indicating that vehicle 102 is entering a specific lane of the roadway 110 of the tolling area. In an example, the message 400 may be displayed in the HMI 114 of the vehicle 102. The message 400 may indicate, for instance, the costs that will be charged to the vehicle 102 for use of the lane in which the vehicle 102 is traveling.

Figure 5:
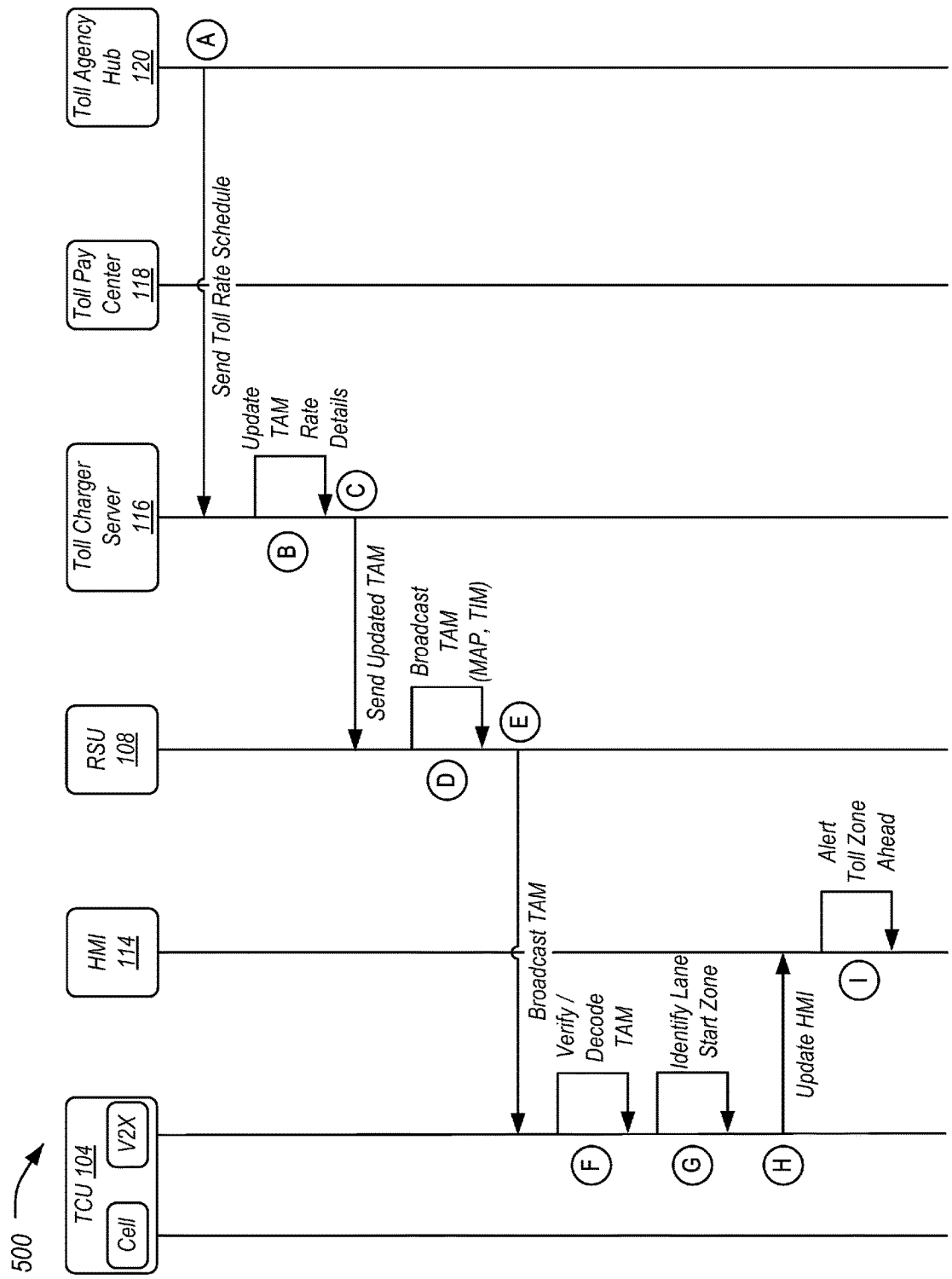
FIG. 5 illustrates a portion of a dataflow for the providing of toll advertisement messages to vehicles.

FIG. 5 illustrates a portion of a dataflow 500 for the providing of toll advertisement messages (TAMs) to vehicles 102. In an example, the dataflow 500 may be performed by the elements of the system 100 described in detail herein.

At index (A), the toll agency hub 120 sends a toll rate schedule to the toll charger server 116. This toll rate table may include information that may be used to allow a vehicle 102 to understand the charges that may be incurred to traverse the roadway 110. In a simple example, the toll rate schedule may indicate that the cost to traverse the roadway 110 is a fixed amount. However, in many examples, the cost to traverse the roadway 110 may vary according to various factors. For instance, travel in a first lane may incur a first charge, while travel in another lane may incur a second, different, charge. In another example, the cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of week, and/or weather.

At index (B), the toll charger server 116 updates the TAM rate details. In an example, the toll charger server 116 receives the toll rate schedule, identifies current rates, and updates rate information at the toll charger server 116. This rate information may be cached at the toll charger server 116 and sent to the RSU 108 at index (C). The RSU 108 may broadcast the rate information as well as other information at index (D) in a TAM message. This broadcast may be a periodic broadcast, such as a rebroadcast of the TAM every 100 milliseconds.

Figure 6:
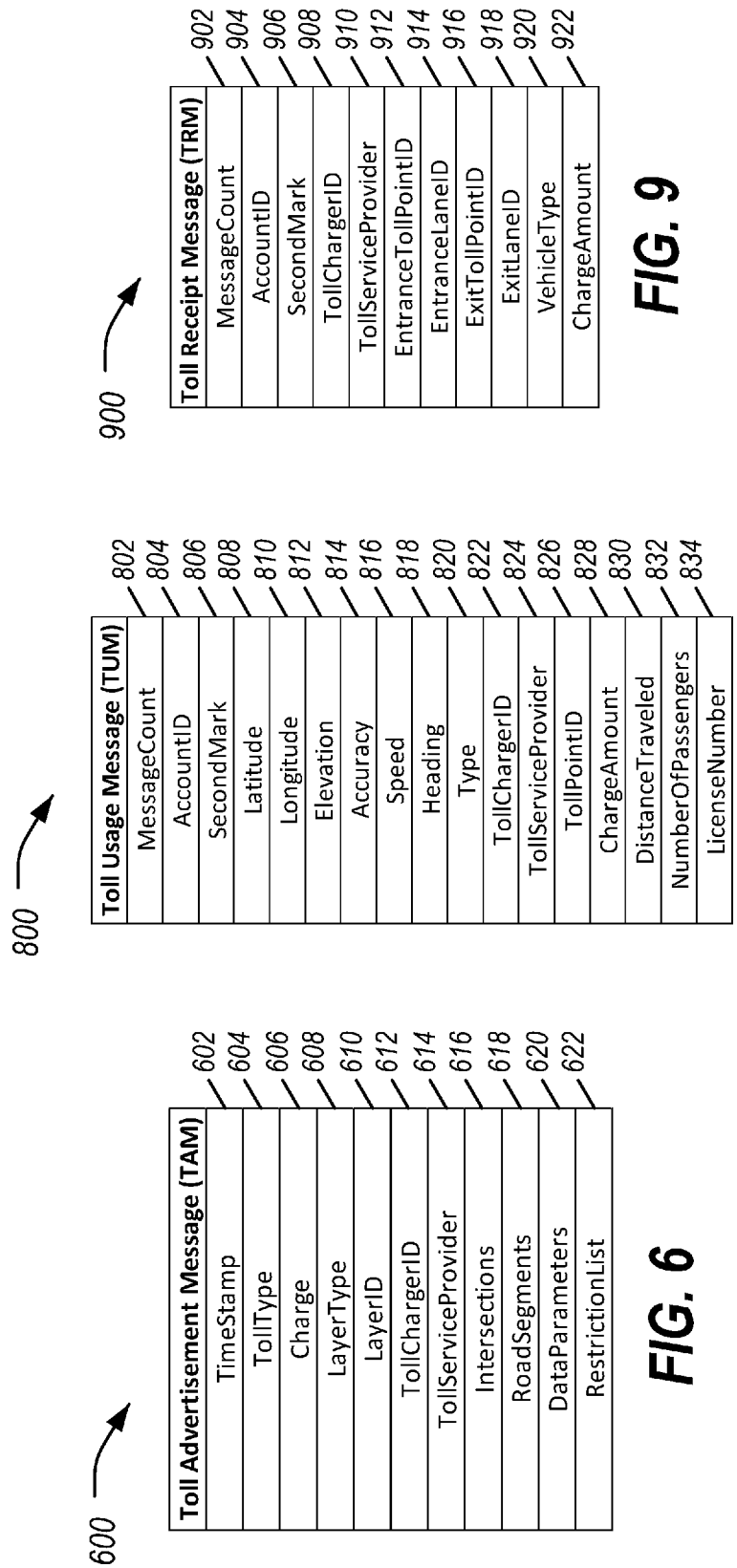
FIG. 6 illustrates an example of a toll advertisement message.

FIG. 6 illustrates an example of a TAM 600. The TAM 600 includes various information that may be useful for vehicles 102 in understanding usage of the roadway 110. As shown, the TAM 600 includes fields such as: a timestamp 602 indicative of the time at which the TAM 600 was created or sent, toll types 604 and toll amounts 606 indicative of how the toll information is charged (e.g., based on the toll rate table), a layer type 608, a layer identifier 610, an identifier 612 of the toll charger server 116, and an identifier 614 of the toll pay center 118. The layer type 608 may be a data element used to uniquely identify a type of information to be found in a layer of a geographic map fragment such as an intersection. The layer identifier 610 may correspondingly be an identifier of map information. The identifier 614 may be a globally-unique identifiers (GUID), to allow the toll pay centers 118 to be uniquely identified by the system 100.

The TAM 600 also includes map information indicative of the layout of the roadway 110, such as an intersection geometry list 616 and a road segment list 618. The road segment list 618 include various properties of the roadway, including lane description, high occupancy status, and so on. This information may include, for instance, indications of the layout of the lanes of the roadway 110 (e.g., using a collection of points as shown in FIG. 2), which may be used to allow vehicles 102 to identify when a tolled area is approached, as well as in which lane the vehicle 102 is traveling. Further aspects of map data and other details of message elements described herein are further defined in the J2735 standard Dedicated Short Range Communications (DSRC) Message Set Dictionary™, published by SAE International, the standard being incorporated herein by reference in its entirety.

The TAM 600 may also include other information such as a list of data parameters 620. This may include, for instance, other information that may be relevant for tolling that does not fit into the other categories of information, such as special instructions for use of the toll roadway 110. The TAM message 600 may also include a restrictions list 622, which may include information regarding limits to access to the roadway 110, such as weight limits, or restrictions against certain classes of vehicles 102 (e.g., no semitrucks allowed).

Referring back to FIG. 5, at index (E) the TCU 104 of the vehicle 102 may receive the TAM 600 broadcast by the RSU 108. Responsive to receipt of the TAM 600, at index (F) the vehicle 102 verifies the authenticity of the TAM 600. In one example, the TAM 600 may be encoded with a key and/or signed using a certificate, and the TCU 104 may utilize a key or other information to decrypt and/or confirm the sender of the TAM 600 as being the RSU 108.

Once the TAM 600 is authenticated, the TCU 104 identifies that, according to the information in the TAM 600, that the vehicle 102 is approaching the roadway 110. Further aspects of the identification are discussed above with respect to FIG. 2. Responsive to the identification, at index (H) the TCU 104 provides an update to the HMI 114, which is provided to the user at index (I) to alert the user of the upcoming toll zone. An example of such an HMI 114 is described with respect to FIG. 3.

Figure 7:
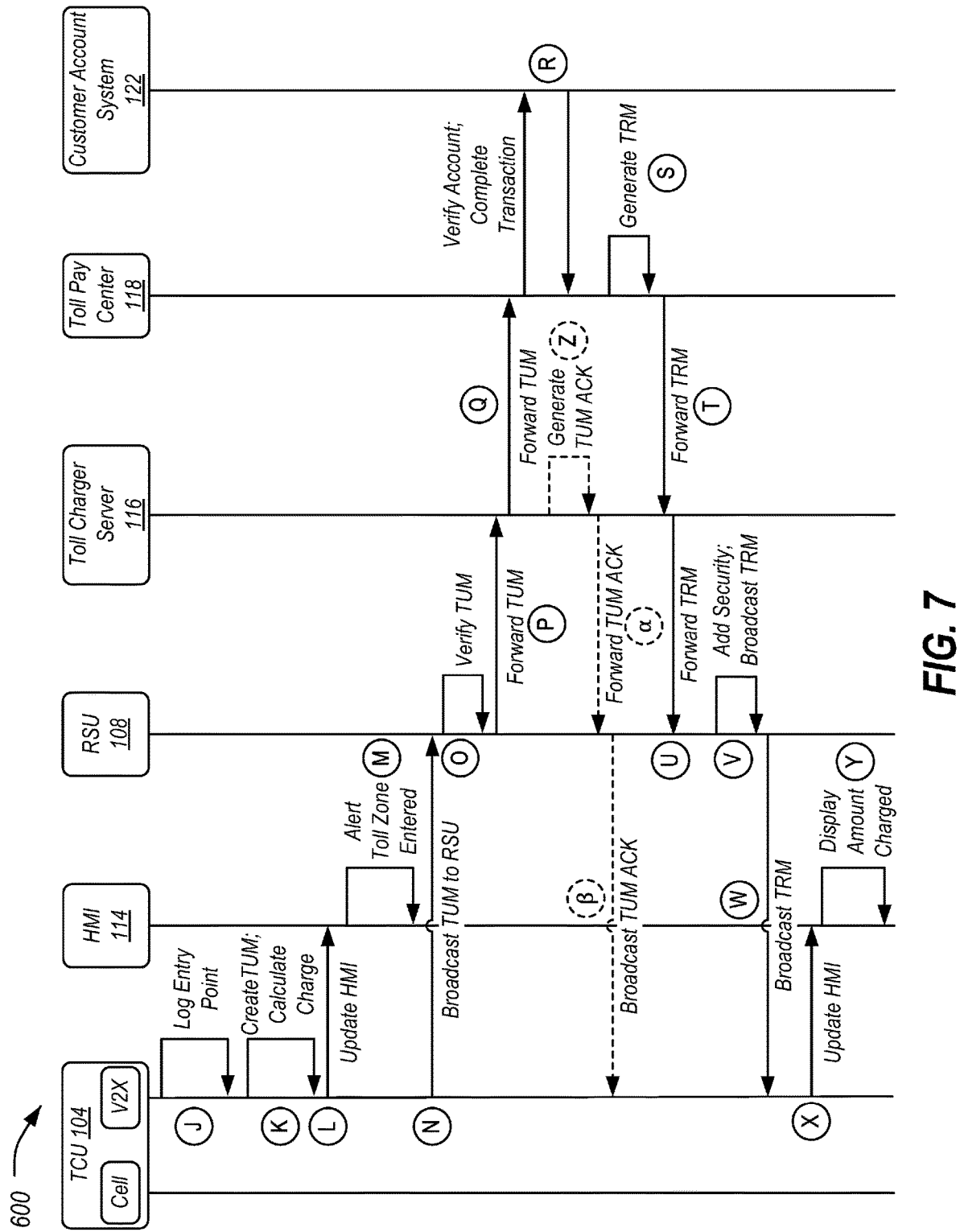
FIG. 7 illustrates a portion of a dataflow for the completion of tolled vehicle access to the roadway.

FIG. 7 illustrates a portion of a dataflow 700 for the completion of tolled vehicle 102 access to the roadway 110. In an example, as with the dataflow 500, the dataflow 700 may be performed by the elements of the system 100 described in detail herein. Referring to FIG. 7, and with continued reference to the dataflow 500 of FIG. 5, the vehicle 102 may have identified that the vehicle 102 has approached the roadway 110. At index (J), the vehicle 102 logs entry into the roadway 110. For instance, responsive to the geographic coordinates of the vehicle 102 matching one of the lanes of the roadway 110, the TCU 104 may identify that the vehicle 102 is entering a specific lane of the roadway 110. Knowing the lane of entry, the TCU 104 at index (K) may then calculate the charge to be incurred by the vehicle 102. The TCU 104 may also generate a toll usage message (TUM).

FIG. 8 illustrates an example of a TUM 800. The TUM 800 includes various information provided by vehicles 102 to RSUs 108 that indicates usage of the roadway 110 by the vehicle 102. As shown, the TUM 800 includes fields such as a message count 802 that indicates a unique number of the TUM 800 for the transaction. The message count 802 may be used to help in identifying if any packet loss has occurred. The TUM 800 may also include a unique random identifier 804 that may be used as a temporary account identifier to track the transaction of messaging between the vehicle 102 and the broadcast message interface of the RSU 108, while preserving relative anonymity of the vehicle 102.

The TUM 800 may also include information about the vehicle 102 entry to the toll area. For instance, the TUM 800 may include a timestamp 806 the time when the TUM 800 was created, latitude 808, longitude 810, and elevation 812 of the vehicle 102, positional accuracy 814 of the latitude 808, longitude 810, and elevation 812, speed 816 of the vehicle 102, and heading 818 of the vehicle 102. The TUM 800 may also include other information, such as type 820 of the vehicle 102, an identifier 822 of the toll charger server 116, and an identifier 824 of the toll pay center 118. The identifiers 822 and the identifiers 824 may be GUIDs, to allow the toll charger servers 116 and toll pay centers 118 to be uniquely identified. The TUM 800 may also include an intersection identifier 826 of the intersection through which the vehicle 102 entered the roadway 110, where the intersection identifier 826 was received by the vehicle 102 in the TAM 600 (e.g., via the intersection geometry list 616 and/or road segment list 618). The TUM 800 may also include a charge amount 828 for the travel in the tolled area as determined by the vehicle 102 using the information in the TAM 600. Other information may also be included in the TUM 800, such as the distance traveled 830 by the vehicle 102, a number of passengers 832 in the vehicle 102, and a license plate number 834 or other identifier of the vehicle 102.

Referring back to FIG. 7, the TCU 104 may update the HMI 114 at index (L), to cause the HMI 114 to display a message at index (M) indicating that the vehicle 102 entered the toll zone. The HMI 114 may further indicate that the vehicle 102 will be charged the amount indicated for the lane that the vehicle 102 is in.

At index (N), the TCU 104 sends the TUM 800 to the RSU 108. At index (O) the RSU 108 verifies the TUM 800. In one example, the TUM may be encoded with a key and/or signed using a certificate, and the RSU 108 may utilize a key or other information to decrypt and/or confirm the sender of the TUM as being the TCU 104. At index (P), the RSU 108 forwards the TUM 800 to the toll charger server 116. In turn, at index (Q) the toll charger server 116 forwards the TUM 800 to the toll pay center 118 corresponding to the vehicle 102. At index (R), the toll pay center 118 verifies the vehicle 102 account with the customer account system 122 and completes the transaction. At index (S), the toll pay center 118 generates a toll receipt message (TRM) to be returned to the vehicle 102.

FIG. 9 illustrates an example of a TRM 900. The TRM 900 includes various information determined by the toll pay center 118 in support of completion of the toll transaction performed with the vehicle 102. As shown, the TRM 900 includes a message count 902 (to help in identifying if any packet loss has occurred), the account identifier from the TUM 800, the timestamp 906 the time when the TUM 800 was created, an identifier 808 of the toll charger server 116, and an identifier 810 of the toll pay center 118 (e.g., a GUID). The TRM 900 may also include an intersection identifier 912 of the intersection through which the vehicle 102 entered the roadway 110 (e.g., as indicated in the TUM 800 that was processed by the toll pay center 118), a lane identifier 914 of which lane through which the vehicle 102 entered the roadway 110 (e.g., as indicated in the TUM 800 that was processed by the toll pay center 118), an intersection identifier 916 of the intersection through which the vehicle 102 exited the roadway 110, and a lane identifier 918 of which lane through which the vehicle 102 exited the roadway 110. The TRM 900 may also include the vehicle type 920 and the amount charged 922 for access to the roadway 110.

Returning back to FIG. 7, at index (T) the toll pay center 118 forwards the TRM 900 to the toll charger server 116. In turn, at index (U) the toll charger server 116 forwards the TRM 900 back to the RSU 108. As the RSU 108 broadcasts messages to vehicles 102, at index (V) the RSU 108 adds security to the TRM 900 (e.g., via encryption with a key, signing with a certificate, etc.). At index (W) the RSU 108 broadcasts the TRM 900, which may be received by the TCU 104 of the vehicle 102. The TCU 104 may update the HMI 114 at index (X), to cause the HMI 114 to display a message at index (Y) indicating completion of the process and the final charged amount.

It should be noted that, in some instances, the processing of the TUM 800 at the toll pay center 118 may exceed a timeout period of time. For instance, the toll charger server 116 may commit to providing a response to the vehicle 102 of the TUM 800 within a period of time such as 500 milliseconds, one second, two seconds, etc. If the period expires, then the toll charger server 116 may generate a TUM acknowledgement (ACK) message at index (Z), in cases where the TRM 900 has not yet been received from the toll pay center 118. In one example, the TUM acknowledgement may be similar to the TRM 900, but with certain fields not filled out, such as the amount charged 922.

At index (α), the toll charger server 116 forwards the TUM acknowledgement to the RSU 108, which is then broadcast at index (β) in an attempt to provide feedback to the vehicle 102. The remainder of the processing with the providing of the full TRM 900 may still be performed, and in such cases the vehicle 102 may likely receive both the TUM acknowledgement and also the TRM 900.

It should also be noted that, in some instances, the TCU 104 may broadcast the TUM 800 at index (N) but may not hear either a TRM 900 or a TUM ACK from the RSU 108 within a timeout period of time (e.g., thirty seconds, one minute, two minutes, etc.). In such a circumstance, the data flow may return back to index (N), such that the TCU 104 of the vehicle 102 may rebroadcast the TUM 800 to the RSU 108. The rebroadcast TRM 900 sent again by the TCU 104 may include the same unique random identifier 804/temporary account identifier, so that if multiple TUM 800 messages are actually received by the RSU 108, the system 100 will be able to confirm the unique random identifier 804 is the same and only charge the TCU 104 once.

Figure 10:
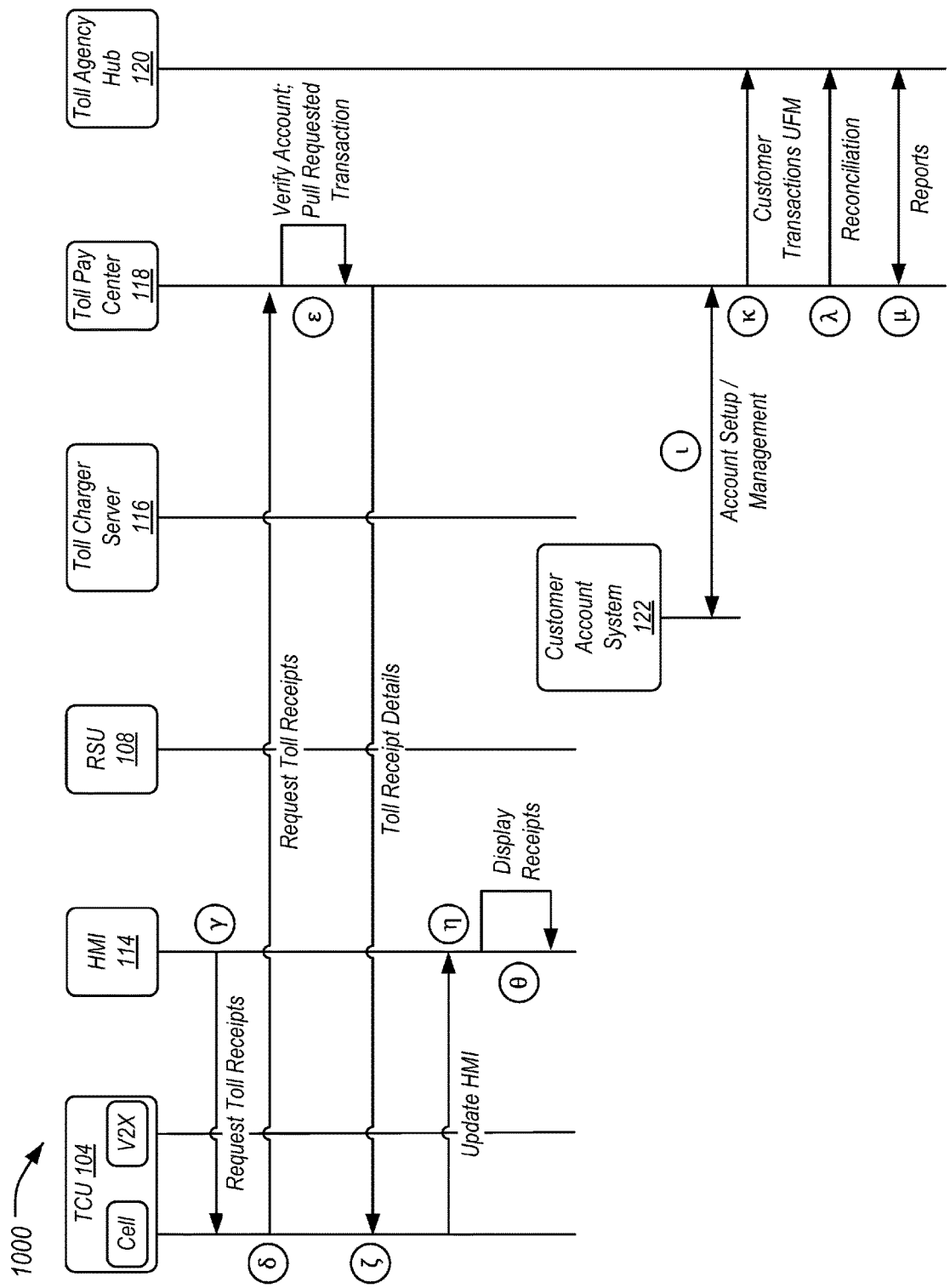
FIG. 10 illustrates a portion of a dataflow for the requesting of toll receipts for completed vehicle accesses to the roadway, as well as for the maintenance of vehicle account settings.

FIG. 10 illustrates a portion of a dataflow 1000 for the requesting of toll receipts for completed vehicle 102 accesses to the roadway 110, as well as for the maintenance of vehicle 102 account settings. In an example, as with the dataflows 500 and 700, the dataflow 1000 may be performed by the elements of the system 100 described in detail herein.

With respect to the toll receipts aspect of the dataflow 1000, at index (γ) the HMI 114 receives a request from a user to see a listing of toll receipts (e.g., for the vehicle 102, for the current user of the vehicle 102, for a current account logged into the vehicle 102, etc.). This request is received by the TCU 104. At index (δ), the TCU 104 sends a request for the toll receipts to the toll pay center 118. Notably, as opposed to the communications to the RSU 108, this communication may be performed using cellular service, and the vehicle 102 would not be required to be within range of the C-V2X functionality of the RSU 108. The toll pay center 118 processes the request at index (ε), which may include, verification of the vehicle 102 and/or account, lookup of transactions, and the packaging up the transaction information for responding back to the vehicle 102. The toll receipt information may include information such as dates and times that toll charges were incurred, how much the charges were, and where the charges were incurred. The TCU 104 may receive the toll receipt information from the toll pay center 118 at index (ζ), and may update the HMI 114 at index (η) to provide the information to the user at index (θ).

With respect to the account maintenance aspects of the dataflow 1000, at index (ι) the toll pay center 118 and the customer account system 122 may perform account setup and management operations. This may include, for instance, the upload of account information from the customer account system 122 to the toll pay center 118. In one example, this may include account information set up for the vehicle 102 through a service such as FordPass™. In another aspect, at index (κ), the toll pay center 118 may perform universal financial message (UFM) customer transactions. UFMs may be created when a vehicle 102 passes through the toll payment zone at the roadside. From the toll pay center 118, the UFM messages are created and update to toll agency hub based on the request. It should be noted that the UFMs may be processed synchronously with passage of the vehicles 102 along the roadway 110 and processing of the transactions as mentioned above at index (R). However, in other examples it should be noted that the transactions may be processed asynchronously, such as in bulk every hour or day (e.g., nightly). In yet a further aspect, at index (λ) the toll pay center 118 may perform reconciliation with the toll agency hub 120, and at index (μ) the toll pay center 118 and the toll agency hub 120 may perform reporting functions with one another.

Figure 11:
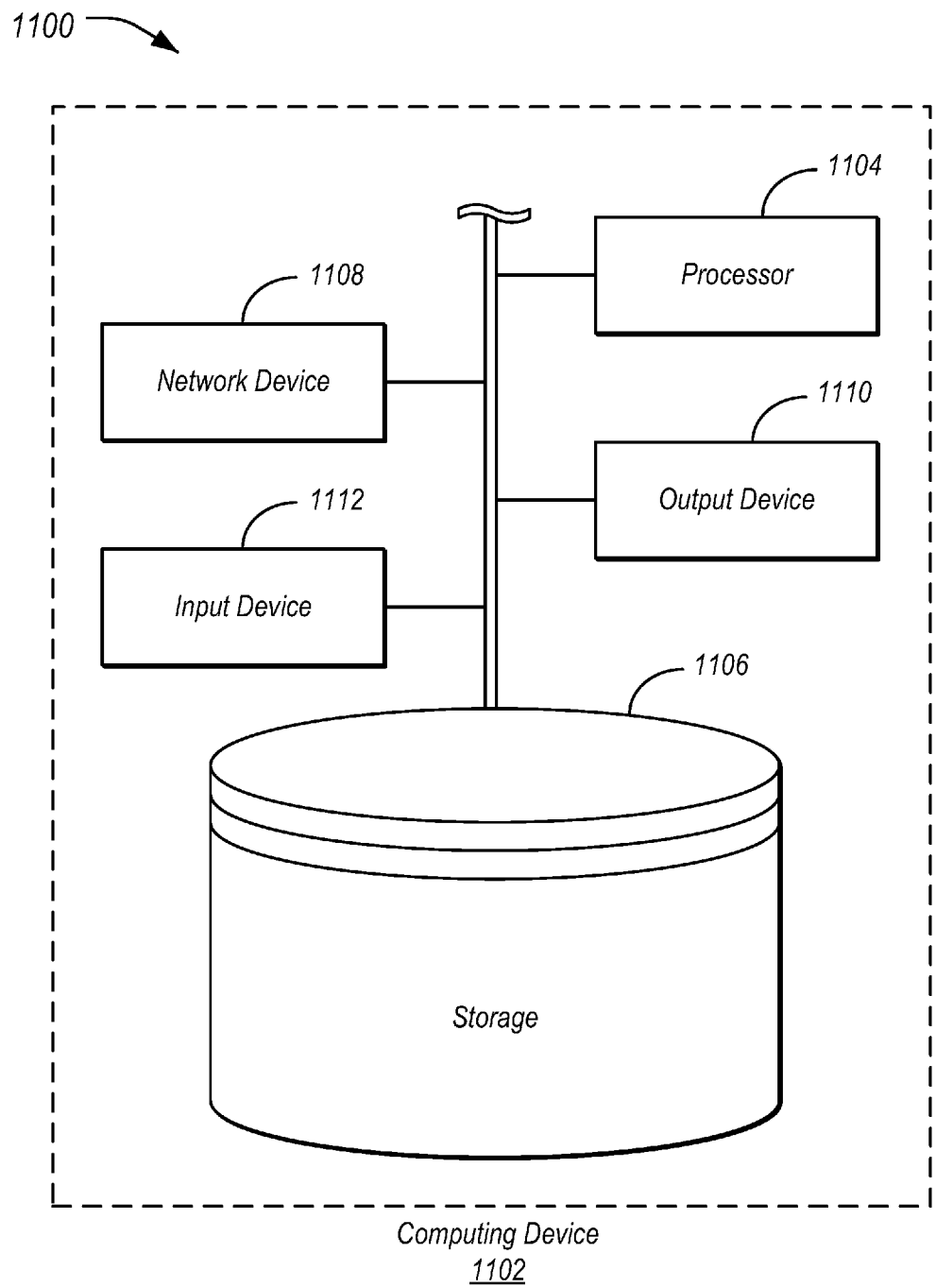
FIG. 11 illustrates an example of a computing device.

FIG. 11 illustrates an example 1100 of a computing device 1102. Referring to FIG. 11, and with reference to FIGS. 1, 5, 7, and 10, the TCU 104, RSU 108, toll charger server 116, toll pay center 118, toll agency hub 120, and customer account system 122 may be examples of such computing devices 1102. As shown, the computing device 1102 may include a processor 1104 that is operatively connected to a storage 1106, a network device 1108, an output device 1110, and an input device 1112. It should be noted that this is merely an example, and computing devices 1102 with more, fewer, or different components may be used.

The processor 1104 may include one or more integrated circuits that implement the functionality of a central processing unit (CPU) and/or graphics processing unit (GPU). In some examples, the processors 1104 are a system on a chip (SoC) that integrates the functionality of the CPU and GPU. The SoC may optionally include other components such as, for example, the storage 1106 and the network device 1108 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 1104 executes stored program instructions that are retrieved from the storage 1106. The stored program instructions, accordingly, include software that controls the operation of the processors 1104 to perform the operations described herein. The storage 1106 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1110. The output device 1110 may include a graphical or visual display device, such as an electronic display screen, projector, printer, or any other suitable device that reproduces a graphical display. As another example, the output device 1110 may include an audio device, such as a loudspeaker or headphone. As yet a further example, the output device 1110 may include a tactile device, such as a mechanically raiseable device that may, in an example, be configured to display braille or another physical output that may be touched to provide information to a user.

The input device 1112 may include any of various devices that enable the computing device 1102 to receive control input from users. Examples of suitable input devices that receive human interface inputs may include keyboards, mice, trackballs, touchscreens, voice input devices, graphics tablets, and the like.

The network devices 1108 may each include any of various devices that enable the TCU 104, RSU 108, toll charger server 116, toll pay center 118, toll agency hub 120, and customer account system 122 to send and/or receive data from external devices over networks (such as the communications network 106). Examples of suitable network devices 1108 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for smart tolling, comprising:
    a telematics control unit configured to provide vehicle-to-everything (V2X) communication; and
    a processor, programmed to
        receive a toll advertisement message (TAM) broadcast from a roadside unit via V2X communication, the TAM indicating geographic locations of lanes of a roadway for which tolls are due and cost information for traversing the lanes of the roadway,
        identify entrance of the vehicle into a start zone for the roadway, the start zone indicated by the geographic locations,
        indicate, to a user interface of the vehicle, that the vehicle has entered the start zone for the roadway,
        identify one of the lanes of the roadway into which the vehicle is entering according to the geographic locations, and
        indicate, to the user interface of the vehicle, that the vehicle has entered the one of the lanes.

2. The vehicle of claim 1, wherein the processor is further programmed to:
    responsive to identifying the one of the lanes of the roadway into which the vehicle is entering, broadcast a tolling usage message (TUM) via V2X communication, the TUM indicating, to the roadside unit, information regarding the vehicle and a unique random account identifier to be used by the roadside unit to identify the vehicle.

3. The vehicle of claim 2, wherein the processor is further programmed to, responsive to a predefined timeout period expiring since the TUM was broadcast, rebroadcast the TUM to the roadside unit using the unique random account identifier.

4. The vehicle of claim 2, wherein the processor is further programmed to:
    receive a toll receipt message (TRM) broadcast from the roadside unit via V2X communication, the TRM including the unique random account identifier and indicating, to the vehicle, a final cost charged to the vehicle for access to the one of the lanes of the roadway; and
    indicate, to the user interface of the vehicle, the final cost.

5. The vehicle of claim 4, wherein the telematics control unit is further configured to provide cellular communication, and the processor is further programmed to:
- request, via cellular communication, toll receipts from a toll pay center processing the tolls for the roadway,
- receive the toll receipts via cellular communication from the toll pay center, and
- indicate the toll receipts to the user interface of the vehicle.

6. The vehicle of claim 1, wherein the processor is further programmed to:
- identify the one of the lanes of the roadway into which the vehicle is entering according to the vehicle passing through a set of geographic points specified by the TAM as leading to the one of the lanes.

7. A system for smart tolling, comprising:
a toll charger server; and
a roadside unit (RSU), configured to broadcast to vehicles via V2X communication and to communicate with the toll charger server over a secure channel, wherein the RSU is programmed to
- broadcast toll advertisement messages (TAMs) via the V2X communication, each of the TAMs indicating geographic locations of lanes of a roadway for which tolls are due and cost information for traversing the lanes of the roadway,
- receive a tolling usage message (TUM) via the V2X communication, the TUM indicating, to the RSU, information regarding a vehicle entering one of the lanes of the roadway and a unique random account identifier to be used by the RSU to identify the vehicle, and
- broadcast a toll receipt message (TRM) via the V2X communication, the TRM including the unique random account identifier and indicating, to the vehicle, a final cost charged to the vehicle for access to the one of the lanes of the roadway.

8. The system of claim 7, wherein the toll charger server is programmed to:
- receive, from a toll agency hub, a toll rate schedule indicating the cost information, and
- send the toll rate schedule to the RSU to cause the RSU to update the cost information in the TAMs.

9. The system of claim 7, wherein the toll charger server is programmed to:
- forward the TUM to a toll pay server configured to process payment for the vehicle traversing the roadway,
- receive, from the toll pay server, the TRM, and
- send the TRM to the RSU for broadcast.

10. The system of claim 9, wherein the toll charger server is programmed to:
- responsive to lack of receipt of the TRM from the toll pay server within a predefined timeout period, send a TUM acknowledgement to the RSU to broadcast to the vehicle, the TUM acknowledgement informing the vehicle that the TUM was received.

11. The system of claim 7, wherein the RSU is further programmed to:
- receive a second TUM via the V2X communication,
- compare a unique random account identifier in the second TUM to unique random account identifiers of previously-received TUMs, such that if the unique random account identifier in the second TUM matches that of one of the unique random account identifiers of previously-received TUMs, the second TUM is discarded.

12. A method for smart tolling, comprising:
- broadcasting toll advertisement messages (TAMs) via V2X communication, each of the TAMs indicating geographic locations of lanes of a roadway for which tolls are due and cost information for traversing the lanes of the roadway;
- receiving a tolling usage message (TUM) via the V2X communication, the TUM indicating, to a roadside unit (RSU), information regarding a vehicle entering one of the lanes of the roadway and a unique random account identifier to be used by the RSU to identify the vehicle; and
- broadcasting a toll receipt message (TRM) via the V2X communication, the TRM including the unique random account identifier and indicating, to the vehicle, a final cost charged to the vehicle for access to the one of the lanes of the roadway.

13. The method of claim 12, further comprising:
- receiving, from a toll agency hub, a toll rate schedule indicating the cost information; and
- sending the toll rate schedule to the RSU, to cause the RSU to update the cost information in the TAMs.

14. The method of claim 12, further comprising:
- forwarding the TUM to a toll pay server configured to process payment for the vehicle traversing the roadway;
- receiving, from the toll pay server, the TRM; and
- sending the TRM to the RSU for broadcast.

15. The method of claim 14, further comprising:
- responsive to lack of receipt of the TRM from the toll pay server within a predefined timeout period, sending a TUM acknowledgement to the RSU to broadcast to the vehicle, the TUM acknowledgement informing the vehicle that the TUM was received.

16. A method for smart tolling, comprising:
- receiving, by a telematics control unit of a vehicle, a toll advertisement message (TAM) broadcast from a roadside unit via V2X communication, the TAM indicating geographic locations of lanes of a roadway for which tolls are due and cost information for traversing the lanes of the roadway,
- identifying entrance of the vehicle into a start zone for the roadway, the start zone indicated by the geographic locations,
- indicating, to a user interface of the vehicle, that the vehicle has entered the start zone for the roadway,
- identifying one of the lanes of the roadway into which the vehicle is entering according to the geographic locations, and
- indicating, to the user interface of the vehicle, that the vehicle has entered the one of the lanes.

17. The method of claim 16, further comprising:
- responsive to identifying the one of the lanes of the roadway into which the vehicle is entering, broadcasting a tolling usage message (TUM) via V2X communication, the TUM indicating, to the roadside unit, information regarding the vehicle and a unique random account identifier to be used by the roadside unit to identify the vehicle;
- receiving a toll receipt message (TRM) broadcast from the roadside unit via V2X communication, the TRM including the unique random account identifier and indicating, to the vehicle, a final cost charged to the vehicle for access to the one of the lanes of the roadway; and
- indicating, to the user interface of the vehicle, the final cost.

18. The method of claim 17, further comprising:
responsive to a predefined timeout period expiring since the TUM was broadcast, rebroadcasting the TUM to the roadside unit using the unique random account identifier.

19. The method of claim 16, further comprising:
requesting, via cellular communication, toll receipts from a toll pay center processing the tolls for the roadway,
receiving the toll receipts via cellular communication from the toll pay center, and
indicating the toll receipts to the user interface of the vehicle.

20. The method of claim 16, further comprising:
identifying the one of the lanes of the roadway into which the vehicle is entering according to the vehicle passing through a set of geographic points specified by the TAM as leading to the one of the lanes.

* * * * *